Aug. 2, 1966     N. J. SAHLSTROM     3,263,968
SLURRY HANDLING APPARATUS
Filed Feb. 19, 1964
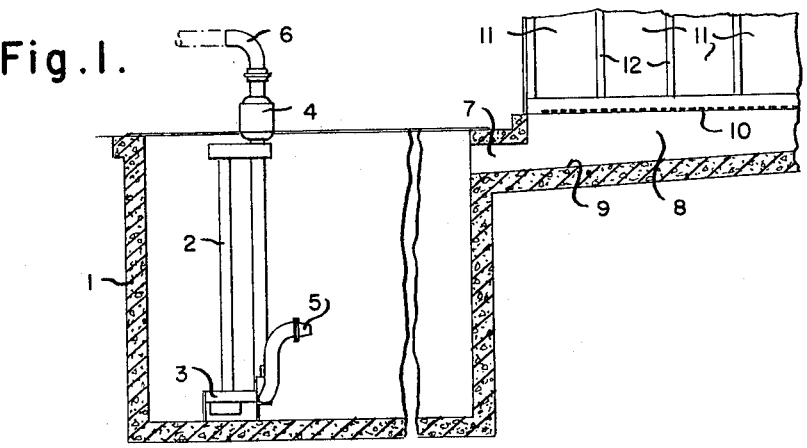
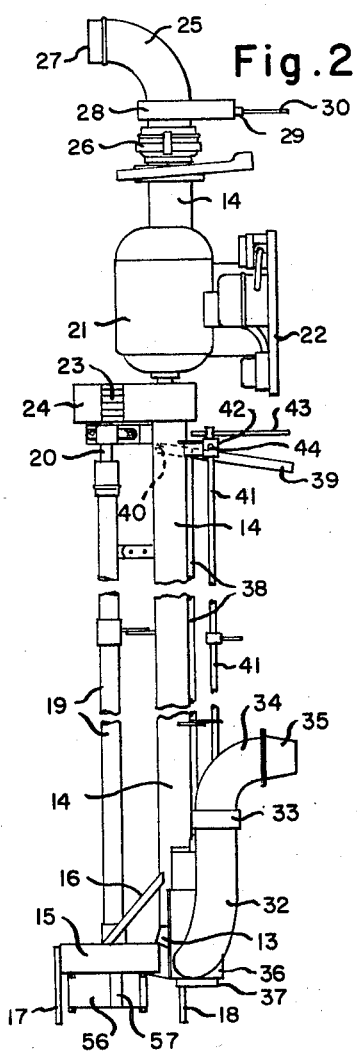
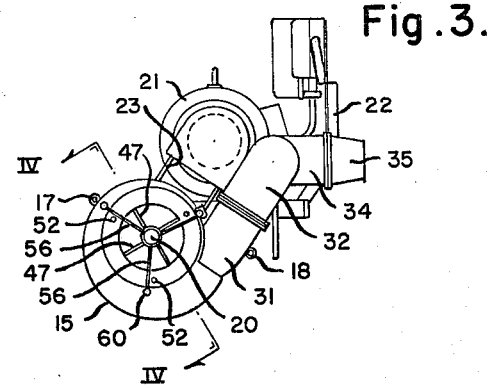
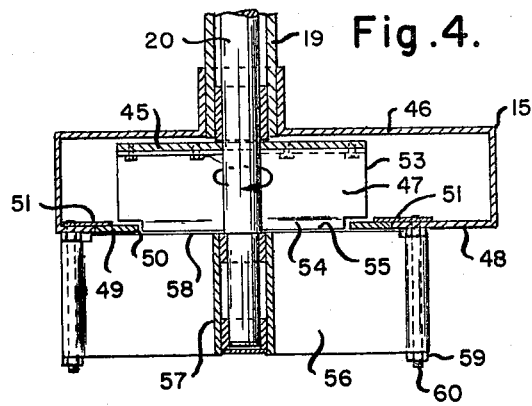
INVENTOR
Nils Johan Sahlstrom
Hoopes, Leonard & Buell
his attorneys United States Patent Office 3,263,968
Patented August 2, 1966

3,263,968
SLURRY HANDLING APPARATUS
Nils Johan Sahlstrom, Suntetorp, Skovde, Sweden
Filed Feb. 19, 1964, Ser. No. 345,989
7 Claims. (Cl. 259—96)

This invention relates to slurry handling apparatus and is particularly adapted for blending of barnyard or stable manure in the form of a slurry and handling the same.

In recent years great attention has been devoted to mechanizing a wide variety of jobs performed on and about farms. Extensive use of tractors and electric power has vastly increased the possible farm production of each individual farmer while reducing the amount of physical labor required. One job in which there has been little advance, however, is that of handling and disposing of manure. As is well known, an inevitable result of the keeping of livestock is the production of manure. Customarily manure is distributed upon fields to be turned under as organic fertilizer. It is customarily moved by hand from the barn to a stockpile outside the barn and is later loaded onto a mechanical spreader for transport to the fields and distribution over them. While the use of mechanical spreaders has reduced the amount of physical labor involved, a substantial amount still remains in the handling and rehandling of the manure. The liquid constituent, which is high in nitrogenous compounds is lost to a large extent by run-off, either in the barn or in the stockpile, thereby causing the loss of many valuable fertilizer elements. Moreover, when the manure is stockpiled outside, further valuable constituents are lost by reason of leaching out of those constituents.

I have invented new and useful improvements which enable barnyard manures and accompanying stable refuse to be handled as slurries. The manual labor required is thereby greatly reduced. Furthermore, all of the manure constituents—liquid and solid—are recovered and preserved without loss for eventual use as fertilizer in precisely the place desired. I provide a slurry receiving tank in position to receive and hold manure and attendent barnyard refuse in the form of a slurry. I provide pump means having an intake positioned in the tank and the level of slurry in the tank. I further provide drive means for said pump, an outlet from said pump adapted to discharge slurry into the tank for agitation and blending of the slurry, and a second outlet from said pump adapted to discharge slurry to a point outside said tank. I further prefer to provide means operable to control discharge of slurry from said outlets. I prefer to provide valve means operable to restrict flow to said outlets. I prefer to provide centrifugal pump means having an inlet below the level of slurry and having a plurality of vane-like members extending across the inlet opening of the pump housing and extending axially of the pump away from said inlet opening. I prefer to provide a pump impeller having a plurality of generally radial vanes which pass in close proximity to an inlet opening formed in the pump housing. I prefer to place the fixed members closely adjacent to the zone swept by the vanes of the impeller and extending away from said opening in a direction axially of the impeller. I further preferably provide cutting edges upon those portions of the impeller vanes which sweep close to the fixed vanes.

In the preferred embodiment of my invention, I provide a slurry receiving tank having conduit means for movement of unblended manure and barnyard refuse to said tank. I further provide a centrifugal pump assembly having a generally upright cylindrical housing positioned in the lower portion of said tank, a pump inlet formed in the lower wall of the housing, a plurality of fixed vanes extending across said inlet and extending away from the inlet axially of the pump. I further provided conduit means connected to an outlet from the pump housing and extending therefrom to a first nozzle arranged to discharge slurry to the tank and to a second nozzle arranged to discharge of slurry outside the tank. I also provide slide valves adjacent said first nozzle and second nozzle for controlling discharge of slurry through each of said nozzles. I further provide swivel means to swivel said first nozzle, whereby slurry may be discharged from it to various parts of the tank for complete blending. I additionally provide an impeller within the pump housing having radially extending vanes which sweep adjacent to edges of the fixed vanes and cutting edges formed upon the impeller vanes in portions which pass adjacent to the fixed vanes. I also provide electric motor means driving the pump impeller.

Other details, objects and advantages of my invention will become more apparent as the following description of a present preferred embodiment thereof proceeds.

In the accompanying drawings, I have illustrated a present preferred embodiment of my invention in which FIGURE 1 illustrates a slurry receiving tank with a portion broken away having slurry handling apparatus fitted therein and a portion of a barn for livestock showing some of the stalls;

FIGURE 2 is a detailed view of the pump assembly shown in FIGURE 1;

FIGURE 3 is a bottom view of the apparatus shown in FIGURE 2; and

FIGURE 4 is a sectional view of the pump housing and impeller taken along lines IV—IV of FIGURE 3.

Referring now to FIGURE 1, a portion of slurry receiving tank is shown, but an intermediate section has been broken out of the drawing. Tank 1 is preferably located outside the barn and may be partially or fully below grade. In cold climates it is banked with earth as necessary to protect the contents from freezing. A pump assembly indicated generally by the FIGURE 2 is placed within the tank. A pump indicated at 3 is driven by an electric motor 4 and pumps slurries to a discharge point 5 positioned within the tank or a discharge point 6 positioned outside of the tank. A conduit 7 drains into tank 7 from a trough 8 which is formed into the floor of the barn which tank 1 adjoins. Trough 8 has a bottom 9 which slopes toward tank 1 and is covered by a grating 10. A plurality of stalls 11 are formed by dividers 12. Trough 8 is preferably formed in the floor of the barn just behind the stalls and extending along the length of the row of stalls. In a large barn having several rows of stalls, a trough is provided for each row of stalls. The troughs lead to tank 1 through a common conduit or through separate conduits. The barn floor is preferably concrete or some other impervious material.

Pump assembly 2 is shown in greater detail in FIGURE 2. It comprises a vertically extending conduit 14 which is connected to the discharge opening in a housing 15 of a centrifugal pump. Housing 15 is braced to conduit 14 by a brace 16. Legs 17 and 18 are welded to housing 15 and conduit 14, respectively, and carry the load of the assembly upon the floor of tank 1. A tube 19 is welded to the top of pump housing 15 and extends upwardly to a point above the normal level of slurry in the tank. A pump drive shaft 20 is journaled within tube 19, appropriate bearing seals also being provided to protect the bearings. An electric motor 21 is mounted upon a bracket 22 which may conveniently be fixed to the side wall of tank 1. A plurality of V-belts 23 extend between a pulley upon the motor shaft and a pulley on the top of pump drive shaft 20. Belts 23 are protected by a guard 24.

Conduit 14 extends upwardly to a level above motor 21. An elbow 25 is fitted upon the top of conduit 14 by a swivel connection 26. Elbow 25 terminates in a nozzle 27 which is adapted for discharge outside of the tank, either directly through a hose which may optionally be fitted to nozzle 27. A ramp or loading point is formed to the side of the tank so that a tank wagon or other conveyance may be moved into position to receive slurry discharged from nozzle 27. Since the specific construction forms no part of this invention, and since various expedients will be obvious, the form of loading point employed is not illustrated or further described here.

A valve comprising a box 28 and a slide 29 is fitted in elbow 25. When slide 29 is in one position, it opens the valve for flow of slurry, and when in another position, it closes the valve to flow slurry to nozzle 27. An operating rod 30 may conveniently be attached to slide 29. A branch conduit 31 extends outwardly from the discharge opening of pump housing 15, turns upwardly through a section 32, and terminates in a swivel joint 33. An elbow 34 is also fitted to swivel joint 33 and terminates in a nozzle 35. A valve comprising a box 36 and a slide 37 is fitted in branch conduit 31. An operating rod 38 extends upwardly and is pivotally connected to an operating lever 39 pivoted to conduit 14 at a pivot point 40. An operating rod 41 is connected to elbow 34, it is rotatably fitted in a bushing 42 at its upper end. A lever 43 extends through a hole drilled in the top of rod 41. A set screw 44 is threaded into bushing 42 and is operable to lock rod 41 in any desired position.

Pump housing 15 is arranged in the form of a scroll, the housing providing greater clearance adjacent the discharge outlet 13 from the housing than on the opposite side of the scroll. An impeller is fitted upon pump shaft 20 within housing 15. The impeller comprises a disc 45 which rotates in proximity to the top wall 46 of pump housing 15. A plurality of radially extending vanes 47 are bolted to shaft 20 and disc 45. The bottom wall 48 of housing 15 is originally formed with an opening large enough to receive the impeller of the pump to facilitate assembly of the pump. The opening is then reduced to final size by fitting in a ring 49 having an opening 50 of smaller diameter than the pump impeller. Ring 49 is attached to housing 15 by lugs 51 and bolts 52 so as to become an integral part of the housing. Each vane 47 is narrower at its outer end 53 than closer to the center of the impeller. The vanes become wider in the area of opening 50 and have portions 54 which are turned forwardly in the direction of rotation and which terminate in cutting edges 55. A plurality of fixed vanes 56 extend outwardly from a central core 57 across opening 50. The top edge 58 of vanes 56 are in close proximity to the zone swept by cutting edges 55. Vanes 56 are fastened to housing 15 by nuts 59 and studs 60. The number of fixed vanes is different from the number of vanes mounted on the impeller so that the impeller vanes sweep past only one of the fixed vanes at any one instant of time.

In use of the invention, manure is first collected in tank 1 in the form of a slurry. That operation is readily performed by moving the manure from stalls 11 into trough 8 by a broom or otherwise. Since trough 8 is below the level of the barn floor and extends in close proximity to the stalls, it is unnecessary to lift the manure or move it manually for great distances. The stalls and the entire barn floor may be flushed down with a hose at regular intervals, thereby providing sufficient fluid to form a slurry. Since the barn can be hosed down, it is readily kept clean and sanitary. Straw and other barn refuse is readily disposed of in the same fashion by flushing it into tank 1. Where necessary, a section of grating 10 may be lifted to facilitate the operation.

When a sufficient amount of slurry has accumulated in tank 1 to be disposed of, slide 29 is moved to a position to block flow of slurry through nozzle 27. Slide 37 is moved to a position to open nozzle 35 to the pump outlet.

Motor 21 is then turned on, causing the pump impeller to be rotated at high speed. Vanes 47 cause the slurry between them to revolve and be thrown outwardly by centrifugal force. The forces cause the slurry to pass through housing outlet 13 and thence to nozzle 35 where it exits from the pump assembly. Slurry issuing from nozzle 35 is discharged into tank 1. As the pump impeller revolves throwing slurry outwardly, slurry in the tank will flow into the inlet to replace that issuing from nozzle 35. In this manner the slurry in the tank is recirculated and blended. The blending is facilitated by rotating nozzle 35 to sweep different portions of the tank and to prevent dead pockets of slurry from forming within the tank. As the pump operates, it will draw into the inlet accumulations of straw and the like. Small pieces of straw will, of course, be pumped through without difficulty. Large masses which might block the inlet are broken up by fixed vanes 56 and are thereby drawn to the inlet in smaller masses. The presence of vanes 56 prevents the straw from rotating and agglomerating to mask or block off the entire inlet. As the straw is drawn into the impeller, cutting edges 55 cuts the straw between the cutting edges and edges 58 of fixed vanes 56. In this manner, large pieces of straw and other solid matter decimated and reduced to a size which can readily be handled by the pump.

When the slurry in the tank has been fully blended, slides 29 and 37 are moved to their opposite positions closing off nozzle 35 and causing the slurry to be discharged instead from nozzle 27. The slurry may then be discharged into a tank wagon or the like from which it can readily be distributed over fields in liquid form.

While I have illustrated and described a present preferred embodiment of my invention, it is to be understood that I do not limit myself thereto, and that my invention may be otherwise variously practiced within the scope of the following claims.

I claim:
1. Slurry handling apparatus comprising a slurry receiving tank, slurry pump means including a housing and an impeller and having intake means in the housing for slurry, said intake means being positioned below the normal level of slurry in the tank and having an intake opening of a size comparable to that of the pump impeller, drive means for said pump in driving connection with said impeller, said pump housing being fixed against rotation with the impeller, a first outlet conduit extending upwardly from said pump and terminating above said slurry level, said first conduit being disposed to discharge slurry within said tank and above said slurry level to a remote part thereof so that solid and liquid constituents within the tank can be effectively blended, a second outlet conduit extending from said pump and disposed to discharge blended slurry to a point outside of said tank, and means for selectively controlling the discharge of slurry from said first and said second outlet conduits.

2. The combination according to claim 1 wherein said first outlet conduit is coupled to said fixed pump housing through swivel-joint means, and operating means are provided for swiveling said first outlet conduit so that said slurry can be discharged to different remote parts of said tank, said operating means extending to a point outside of said tank for operation thereat.

3. The combination according to claim 1 wherein flow directing vane means are mounted adjacent said pump intake opening, said vane means extending radially and axially outwardly of said opening.

4. The combination according to claim 3 wherein said vane means have an edge juxtaposed to an edge portion of said pump impeller, and at least one of said edge and said edge portion is a cutting edge.

5. The combination according to claim 4 wherein said pump impeller includes a plurality of impeller blades juxtaposed to said intake opening and said vane means are an unlike plurality of plates each having an edge juxtaposed to said intake opening, said impeller blades and said plates each being equally and radially spaced about said opening, the number of said impeller blades being different than that of said plates so that only one of said impeller blades can be juxtaposed to any of said plates at a given instant.

6. The combination according to claim 2 wherein cutting vane means are fixedly mounted adjacent said intake opening, said vane means extending radially and axially outwardly of said opening.

7. The combination according to claim 3 wherein said vane means are a plurality of fixed plate members extending radially and axially outwardly from said intake opening, and said impeller includes a number of impeller blades each having a cutting edge portion juxtaposed respectively to the adjacent edges of said plates during said impeller rotation.

References Cited by the Examiner

UNITED STATES PATENTS 3,096,718  7/1963  Anderson _____ 103—111.1

FOREIGN PATENTS 556,762  7/1923  France.
448,684  6/1925  Germany.
450,489  11/1926  Germany.

WILLIAM I. PRICE, *Primary Examiner.*

CHARLES A. WILLMUTH, WALTER A. SCHEEL,
*Examiners.*

ROBERT W. JENKINS, *Assistant Examiner.*